(12) United States Patent
Shizu et al.

(10) Patent No.: US 10,944,350 B2
(45) Date of Patent: Mar. 9, 2021

(54) MOTOR DRIVE DEVICE

(71) Applicant: Mitsubishi Electric Corporation, Tokyo (JP)

(72) Inventors: Keiichiro Shizu, Tokyo (JP); Yosuke Shinomoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/612,474

(22) PCT Filed: Jul. 26, 2017

(86) PCT No.: PCT/JP2017/027087
§ 371 (c)(1),
(2) Date: Nov. 11, 2019

(87) PCT Pub. No.: WO2019/021398
PCT Pub. Date: Jan. 31, 2019

(65) Prior Publication Data
US 2020/0235691 A1    Jul. 23, 2020

(51) Int. Cl.
*H02P 25/18* (2006.01)
*H02K 3/46* (2006.01)
(Continued)

(52) U.S. Cl.
CPC .............. *H02P 25/18* (2013.01); *H02K 3/46* (2013.01); *H02P 1/16* (2013.01); *H02P 27/06* (2013.01)

(58) Field of Classification Search
CPC .......... H02P 27/06; H02P 21/22; H02P 25/18; H02P 6/28; H02P 25/184; H02P 1/16; H02P 2203/03; H02K 11/33; H02K 3/46
See application file for complete search history.

(56) References Cited

U.S. PATENT DOCUMENTS 4,952,852 A * 8/1990 Bando ................. H02H 7/06
                                                    318/140
5,587,641 A * 12/1996 Rozman .............. F02N 11/04
                                                    318/400.12
(Continued)

FOREIGN PATENT DOCUMENTS

CN    102418700 A     4/2012
JP    04355697 A  * 12/1992
(Continued)

OTHER PUBLICATIONS

Extended European Search Report dated Jun. 16, 2020 issued in corresponding EP patent application No. 17919026.9.

*Primary Examiner* — Thai T Dinh
(74) *Attorney, Agent, or Firm* — Posz Law Group, PLC

(57) ABSTRACT

A motor drive device capable of switching the connection configuration of the stator windings of a motor includes three relays each including a first contact, a second contact, and a contact plate, where the contact plate has one terminal coupled to a stator winding of one phase among the stator windings and the contact plate has another terminal to be connected to the first contact or to the second contact; and a control unit to control the three relays to cause all the three relays to have a same connection state in a case in which not all the three relays have a same connection state with respect to connections between the another terminal of the contact plate and the first contact and the second contact.

13 Claims, 9 Drawing Sheets

(51) Int. Cl.
*H02P 1/16* (2006.01)
*H02P 27/06* (2006.01)

(56) References Cited

U.S. PATENT DOCUMENTS

| | | | | |
|---|---|---|---|---|
| 5,818,195 A | * | 10/1998 | Frick | H02P 25/184 |
| | | | | 318/771 |
| 6,476,571 B1 | * | 11/2002 | Sasaki | B60W 10/08 |
| | | | | 318/139 |
| 7,348,764 B2 | * | 3/2008 | Stewart | H02P 9/48 |
| | | | | 322/24 |
| 2017/0093242 A1 | * | 3/2017 | Hirotani | B62D 5/04 |

FOREIGN PATENT DOCUMENTS

| | | | | |
|---|---|---|---|---|
| JP | H04-355697 | A | | 12/1992 |
| JP | 2000-121768 | A | | 4/2000 |
| JP | 2000121768 | A | * | 4/2000 |
| JP | 2008-228513 | A | | 9/2008 |
| JP | 2009216324 | A | * | 9/2009 |
| JP | 2012067722 | A | * | 4/2012 |

* cited by examiner

MOTOR DRIVE DEVICE

CROSS REFERENCE TO RELATED APPLICATION

This application is a U.S. national stage application of International Patent Application No. PCT/JP2017/027087 filed on Jul. 26, 2017, the disclosure of which is incorporated herein by reference.

TECHNICAL FIELD

The present invention relates to a motor drive device that drives a motor configured such that the connection configuration of the stator windings can be switched.

BACKGROUND

As an example of conventional motor drive devices, there is a motor drive device that selects a star connection during start-up of the motor and when the operational frequency is less than or equal to a predetermined value, and selects a delta connection when the operational frequency is greater than the predetermined value, and thus provides improved efficiency (Patent Literature 1).

Patent Literature 1 discloses, as one form of motor drive device, a configuration to use three change-over-contact relays and to switch the state of the contact of each of the change-over-contact relays, thus to switch the connection configuration of the stator windings.

PATENT LITERATURE

Patent Literature 1: Japanese Patent Application Laid-open No. 2008-228513

The foregoing conventional configuration uses a coil to switch the contact plate of a relay, and passes a current through the coil to move the contact plate, which is a movable part. Thus, failure to supply electrical power to the coil(s) of one or some of the relays, more specifically, for example, occurrence of disconnection of the conductor wire of a coil, prevents the contact plate from being moved. This causes the contact plate of that relay to be held in contact with only one of the contacts. That is, even when a need arises to switch the connection configuration in response to a change in the operational frequency and the contact plate of each of the relays is then actuated, the state of the contact plate of each of the one or some of the relays will not change. This causes the connection configuration to be neither the star connection nor the delta connection, thereby presenting a problem in that normal operation cannot be performed. Alternatively, failure of the contact plate itself may prevent the contact plate from being moved and may thus prevent normal switching of the connection configuration even in a state where a current can pass through the coil.

SUMMARY

The present invention has been made in view of the foregoing, and it is an object of the present invention to provide a motor drive device capable of providing improved reliability of motor operation.

To solve the problem and achieve the object described above, an aspect of the present invention is directed to a motor drive device capable of switching a connection configuration of stator windings of a motor. The motor drive device includes three relays each including a first contact, a second contact, and a contact plate, wherein the contact plate has one terminal coupled to a stator winding of one phase among the stator windings and the contact plate has another terminal to be connected to the first contact or to the second contact. The motor drive device further includes a control unit to control the three relays to cause all the three relays to have a same connection state in a case in which not all the three relays have a same connection state with respect to a connection between the another terminal of the contact plate and the first contact and the second contact.

A motor drive device according to the present invention provides an advantage of being capable of providing improved reliability of motor operation.

DETAILED DESCRIPTION

A motor drive device according to embodiments of the present invention will be described in detail below with reference to the drawings. Note that these embodiments are not intended to limit the scope of this invention.

First Embodiment

Figure 1:
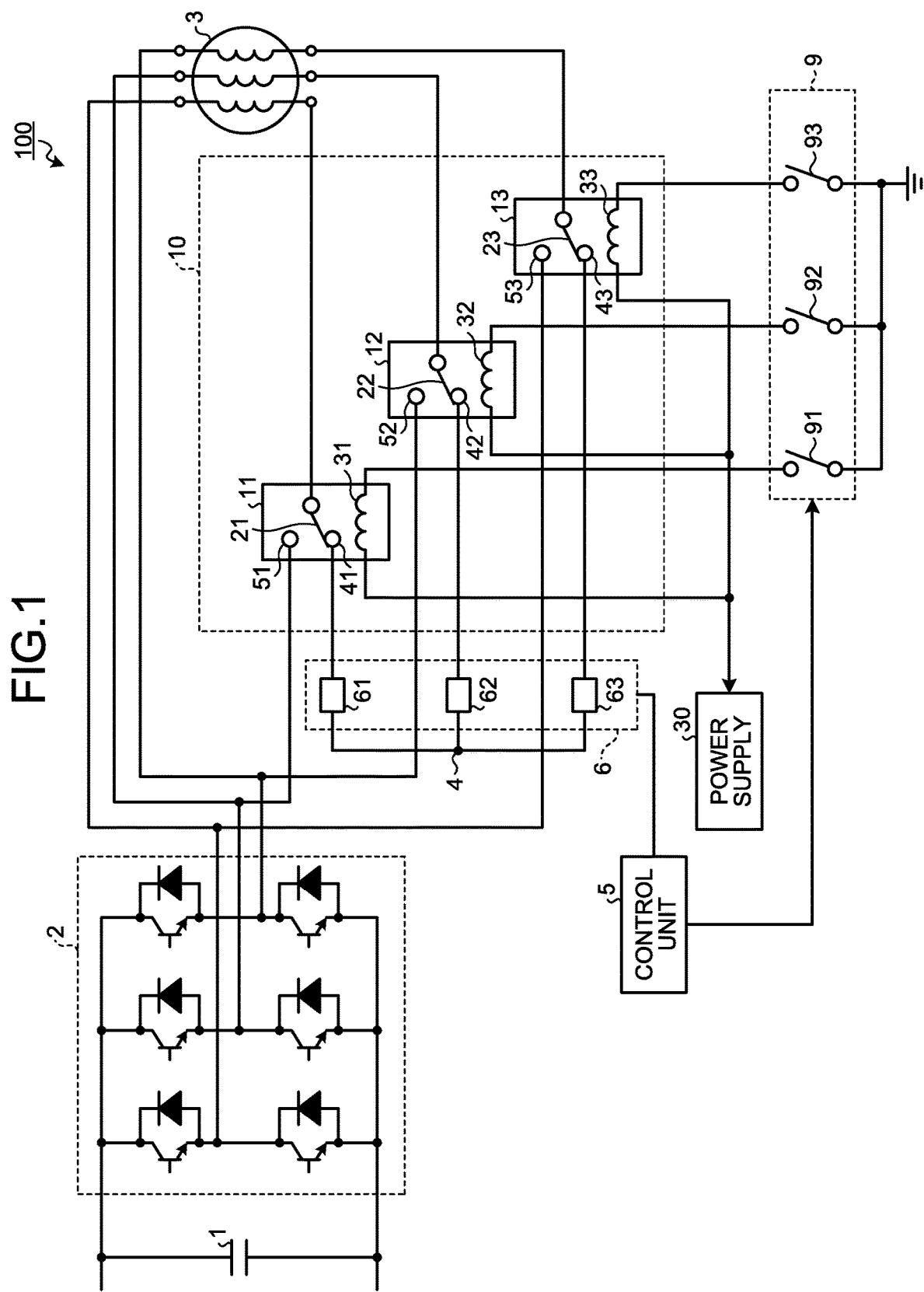
FIG. 1 is a diagram illustrating an example configuration of a motor drive device according to a first embodiment.

FIG. 1 is a diagram illustrating an example configuration of a motor drive device according to a first embodiment of the present invention. A motor drive device 100 according to the first embodiment includes a capacitor 1, an inverter 2, a control unit 5, a state detection unit 6, a switch unit 9, a connection configuration switching unit 10, and a power supply 30.

The capacitor 1 holds direct current (DC) power supplied from a converter (not illustrated) or the like in the form of DC voltage. The inverter 2 converts the DC voltage held by the capacitor 1 into alternating current (AC) voltage by means of pulse width modulation, and applies the AC voltage to a motor 3 to be driven. It is assumed here that the motor 3 has three stator windings having both ends open and is configured such that the connection configuration thereof can be changed. Note that FIG. 1 omits the control circuit for controlling the switching devices included in the inverter 2. The control circuit for controlling the switching devices of the inverter 2 can be implemented using a publicly known circuit.

The control unit 5 actuates contact plates respectively included in relays 11 to 13 described later by controlling the switch unit 9 to change the connection configuration of the stator windings of the motor 3. The state detection unit 6 includes current detectors 61 to 63, and detects the states of the contact plates of the relays 11 to 13 respectively using these current detectors 61 to 63. The switch unit 9 includes switches 91 to 93, and opens and closes the switches 91 to 93 on the basis of control by the control unit 5. The switches 91 to 93 are opened and closed synchronously with one another. That is, the switches 91 to 93 transition from an open state to a closed state at same time, and transition from a closed state to an open state at same time.

The connection configuration switching unit 10 includes the relays 11 to 13, and switches the connection configuration of the stator windings of the motor 3 between a star connection and a delta connection. The relays 11 to 13 are each a change-over-contact relay, and each include a contact plate having one terminal coupled to a stator winding and the other terminal to be connected to a first contact or to a second contact; and a coil for actuating the contact plate. As illustrated, the relay 11 includes a contact plate 21, contacts 41 and 51, and a coil 31. The contact plate 21 connects to the contact 41, which is the first contact, in an initial state in which no current is flowing through the coil 31, and connects to the contact 51, which is the second contact, when a current is flowing through the coil 31. Similarly, the relay 12 includes a contact plate 22, contacts 42 and 52, and a coil 32. The contact plate 22 connects to the contact 42, which is the first contact, in the initial state in which no current is flowing through the coil 32, and connects to the contact 52, which is the second contact, when a current is flowing through the coil 32. The relay 13 includes a contact plate 23, contacts 43 and 53, and a coil 33. The contact plate 23 connects to the contact 43, which is the first contact, in the initial state in which no current is flowing through the coil 33, and connects to the contact 53, which is the second contact, when a current is flowing through the coil 33.

The power supply 30 generates a current that flows through the coils 31 to 33 respectively included in the relays 11 to 13. Note that the switch 91 of the switch unit 9 described above in a closed state causes a current to flow through the coil 31 of the relay 11; the switch 92 in a closed state causes a current to flow through the coil 32 of the relay 12; and the switch 93 in a closed state causes a current to flow through the coil 33 of the relay 13. The power supply 30 may be, for example, a power conversion circuit that converts the DC voltage held by the capacitor 1 into a desired voltage and applies that voltage across the coils 31 to 33.

The three stator windings of the motor 3 each have one terminal coupled to a corresponding one of three output terminals of the inverter 2 and the other terminal coupled to a corresponding one of the contact plates 21, 22, and 23 of the three relays 11, 12, and 13. The contacts 41, 42, and 43 are coupled to a neutral point terminal 4 respectively via the current detectors 61, 62, and 63. The contacts 51, 52, and 53 are respectively coupled to the three output terminals of the inverter 2.

The current detector 61 of the state detection unit 6 has one terminal coupled to the contact 41 of the relay 11 and the other terminal coupled to the neutral point terminal 4. The neutral point terminal 4 is on the neutral point when the stator windings of the motor 3 are connected in star connection. In addition, the current detector 62 has one terminal coupled to the contact 42 of the relay 12 and the other terminal coupled to the neutral point terminal 4. The current detector 63 has one terminal coupled to the contact 43 of the relay 13 and the other terminal coupled to the neutral point terminal 4. As described above, the contact plates 21, 22, and 23 of the relays 11, 12, and 13 are each coupled to one terminal of a corresponding one of the three stator windings of the motor 3. Thus, in a case where the inverter 2 operates to allow a current to flow into the stator windings of the motor 3, when the contact plate 21 of the relay 11 is connected with the contact 41, the current detector 61 detects the current; however, when the contact plate 21 is not connected with the contact 41, the current detector 61 detects no current. In addition, when the contact plate 22 of the relay 12 is connected with the contact 42, the current detector 62 detects the current; however, when the contact plate 22 is not connected with the contact 42, the current detector 62 detects no current. When the contact plate 23 of the relay 13 is connected with the contact 43, the current detector 63 detects the current; however, when the contact plate 23 is not connected with the contact 43, the current detector 63 detects no current.

Accordingly, a detection result of the current detector 61 indicates the state of the contact plate 21 of the relay 11, i.e., whether the contact plate 21 is connected with the contact 41. The state of the contact plate 21 not connected with the contact 41 includes a state in which the contact plate 21 is connected with the contact 51 and a state in which the contact plate 21 connects with neither of the contact 41 and the contact 51. The state in which the contact plate 21 connects with neither of the contact 41 and the contact 51 includes, for example, a state in which an electrically insulating foreign matter is jammed between the contact plate 21 and the contact 41 when no current is flowing through the coil 31, thereby preventing the contact plate 21 from coming into contact with the contact 41; a state in which an electrically insulating foreign matter is jammed between the contact plate 21 and the contact 51 when a current is flowing through the coil 31, thereby preventing the contact plate 21 from coming into contact with the contact 51; and the like. Similarly, a detection result of the current detector 62 indicates the state of the contact plate 22 of the relay 12, and a detection result of the current detector 63 indicates the state of the contact plate 23 of the relay 13. Note that when the contact plate 21 connects with the contact 41, the contact plate 22 connects with the contact 42, and the contact plate 23 connects with the contact 43, the stator windings of the motor 3 are being connected in star connection. In contrast, when the contact plate 21 connects with the contact 51, the contact plate 22 connects with the contact 52, and the contact plate 23 connects with the contact 53, the stator windings of the motor 3 are being connected in delta connection. Note that the following description refers to the connection state with respect to connections between the contact plate and the first contact and the second contact in each of the relays as "internal state".

Figure 2:
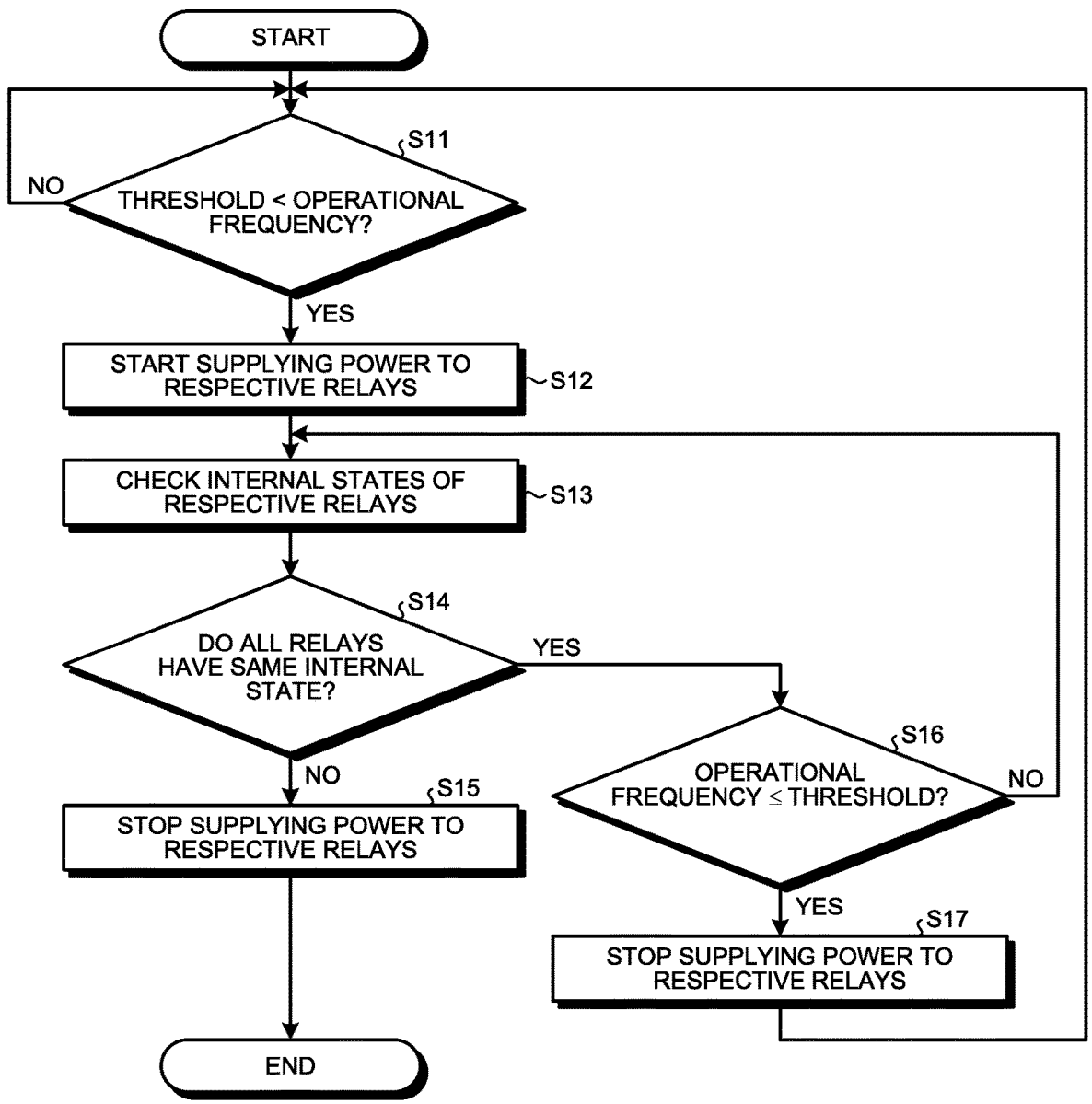
FIG. 2 is a flowchart illustrating an example of operation of switching the connection configuration of the stator windings of the motor performed by the motor drive device according to the first embodiment.

An operation of the motor drive device 100 of switching the connection configuration of the stator windings of the motor 3 will next be described. FIG. 2 is a flowchart illustrating an example of operation of switching the connection configuration of the stator windings of the motor 3 performed by the motor drive device 100. The process at each step illustrated in FIG. 2 is performed by the control unit 5.

The operation according to the flowchart illustrated in FIG. 2 begins when the inverter 2 starts generation of AC voltage to be applied to the motor 3. It is assumed here that, at the time of the start of the operation, the switches 91 to 93 are in the open state, and that the contact plates 21, 22, and 23 of the relays 11, 12, and 13 connect respectively with the contacts 41, 42, and 43. That is, it is assumed that the stator windings of the motor 3 are connected in star connection.

Upon starting of application of AC voltage to the motor 3, the motor drive device 100 checks whether the operational frequency of the motor 3 is greater than a predetermined threshold (step S11). A motor whose connection configuration of the stator windings is switchable between a star connection and a delta connection can operate more efficiently in a star connection at a low operational frequency, and can operate more efficiently in a delta connection at an operational frequency greater than a certain value. Accordingly, a motor whose connection configuration of the stator windings is switchable between a star connection and a delta connection can operate efficiently by selecting the star connection at the start of the operation and selecting the delta connection when the operational frequency is greater than a certain value. Step S11 is a process of determining by the control unit 5 of whether the connection configuration needs to be switched to the delta connection. The operational frequency can be calculated based on, for example, the rotational speed detected by a rotational speed detector (not illustrated) attached to the motor 3. The threshold for use in the comparison with the operational frequency can be set to the operational frequency at which the operating efficiency when the stator windings of the motor 3 are connected in star connection exceeds or falls below the operating efficiency when the stator windings of the motor 3 are connected in delta connection.

If the operational frequency is less than or equal to the threshold (step S11: No), the motor drive device 100 repeats the process at step S11. If the operational frequency is greater than the threshold (step S11: Yes), the motor drive device 100 starts supplying power to the relays 11 to 13 (step S12). Specifically, the control unit 5 controls the switches 91 to 93 to set the switches 91 to 93 to the closed state to start supplying power respectively to the coils 31 to 33 of the relays 11 to 13. This induces magnetic force in the coils 31 to 33 to move the contact plates 21 to 23 of the relays 11 to 13. This connects the contact plate 21 to the contact 51, connects the contact plate 22 to the contact 52, and connects the contact plate 23 to the contact 53. That is, the connection configuration of the stator windings of the motor 3 is switched to the delta connection.

Next, the motor drive device 100 checks the internal states of the relays 11 to 13 (step S13). At this step S13, the control unit 5 determines which of the two contacts the contact plates 21 to 23 of the relays 11 to 13 each connect with, on the basis of the current detection results of the current detectors 61 to 63 of the state detection unit 6. Specifically, the control unit 5 determines that the contact plate 21 of the relay 11 connects with the contact 41 if the current detector 61 detects a current, determines that the contact plate 22 of the relay 12 connects with the contact 42 if the current detector 62 detects a current, and determines that the contact plate 23 of the relay 13 connects with the contact 43 if the current detector 63 detects a current. Note that if the current detector 61 detects no current, the control unit 5 determines that the contact plate 21 of the relay 11 connects with the contact 51 or that the contact plate 21 connects with neither of the contact 41 and the contact 51. A similar operation is performed if the current detectors 62 and 63 detect no current.

Then, the motor drive device 100 checks whether all the relays 11 to 13 have the same internal state (step S14).

If all the relays 11 to 13 have the same internal state (step S14: Yes), the motor drive device 100 checks whether the operational frequency of the motor 3 is less than or equal to a predetermined threshold (step S16). This step S16 is a reverse process of step S11 described above, that is, a process of determining by the control unit 5 of whether the connection configuration of the stator windings needs to be switched to the star connection. Note that the threshold used at step S16 may be the same as or may be different from the threshold used at step S11. In the case of using a threshold different from the threshold used at step S11, the threshold used at step S16 is set to a value lower than the threshold used at step S11.

If the operational frequency is greater than the threshold (step S16: No), the motor drive device 100 returns to step S13 and continues the process.

If the operational frequency is less than or equal to the threshold (step S16: Yes), the motor drive device 100 stops supplying power to the relays 11 to 13 (step S17). Specifically, the control unit 5 controls the switches 91 to 93 to set the switches 91 to 93 to the open state to stop supplying power respectively to the coils 31 to 33 of the relays 11 to 13. This stops the induction of magnetic force in the coils 31 to 33 to move the contact plates 21 to 23 of the relays 11 to 13. This causes the contact plate 21 to connect with the contact 41, the contact plate 22 to connect with the contact 42, and the contact plate 23 to connect with the contact 43. That is, the connection configuration of the stator windings of the motor 3 is switched to the star connection. After performing step S17, the motor drive device 100 returns to step S11 and continues the process.

Otherwise, if not all the relays 11 to 13 have the same internal state, that is, if one or some relays of the relays 11 to 13 have an internal state different from the internal state of the other relay(s) (step S14: No), the motor drive device 100 stops supplying power to the relays 11 to 13 (step S15). This causes, similarly to when step S17 is performed, the connection configuration of the stator windings of the motor 3 to be switched to the star connection. After performing step S15, the motor drive device 100 terminates the operation of switching of the connection configuration of the stator windings, i.e., the operation according to the flowchart illustrated in FIG. 2, and continues the operation, leaving the stator windings of the motor 3 connected in star connection. The determination at step S14 results in "No" if the internal state of any one of the relays 11 to 13 fails to match the internal state of other relays due to a cause such as disconnection of the conductor wire of the coil. In this case, the connection configuration of the stator windings of the motor 3 is neither the star connection nor the delta connection, in which condition continuous operation of the motor 3 is undesirable. Accordingly, the motor drive device 100 performs step S15 to stop supplying power to the relays 11 to 13 to cause all the relays 11 to 13 to have the same internal state. After performing step S15, the motor drive device 100 does not perform switching of the connection configuration of the stator windings of the motor 3 from the star connection to the delta connection even when the operational frequency exceeds the threshold, but can continue the operation of the motor 3. That is, even when the connection configuration switching unit 10 including the relays 11 to 13 for enabling switching of the connection configuration of the stator windings of the motor 3 fails, the motor drive device 100 can continue the operation of the motor 3.

Note that the process may be performed such that processes similar to steps S13 and S14 are performed again after performing step S15 to check whether the relays 11 to 13 have the same internal state and that the motor drive device 100 continues the operation of the motor 3 if the relays 11 to 13 have the same internal state and otherwise stops the operation of the motor 3. In this case, the user may be informed of the occurrence of failure using a notification unit not illustrated.

In addition, the foregoing description assumes that the process returns to step S11 after the performance of step 17, but the motor drive device 100 may perform a process similar to step S13 after performing step S17 to check the internal states of the respective relays. In this case, if all the relays 11 to 13 have the same internal state, the motor drive device 100 returns to step S11 and continues the process. Alternatively, if one or some relays of the relays 11 to 13 have an internal state different from the internal state of the other relay(s), the motor drive device 100 restarts supplying power to the relays 11 to 13 to change the connection configuration of the stator windings of the motor 3 back to the delta connection. After this, similarly to the case of performing step S15 as described above, the motor drive device 100 terminates the operation of switching of the connection configuration of the stator windings. Thus, even when one of the contact plates 21 to 23 of the relays 11 to 13 fails and becomes stuck to the side of the corresponding output terminal of the inverter 2, this situation can be detected, and the control unit 5 then provides control to cause the contact plates 21 to 23 of the relays 11 to 13 to have the same state, and can thus continue the operation while maintaining the connection configuration of the stator windings of the motor 3 in the delta connection.

Figure 3:
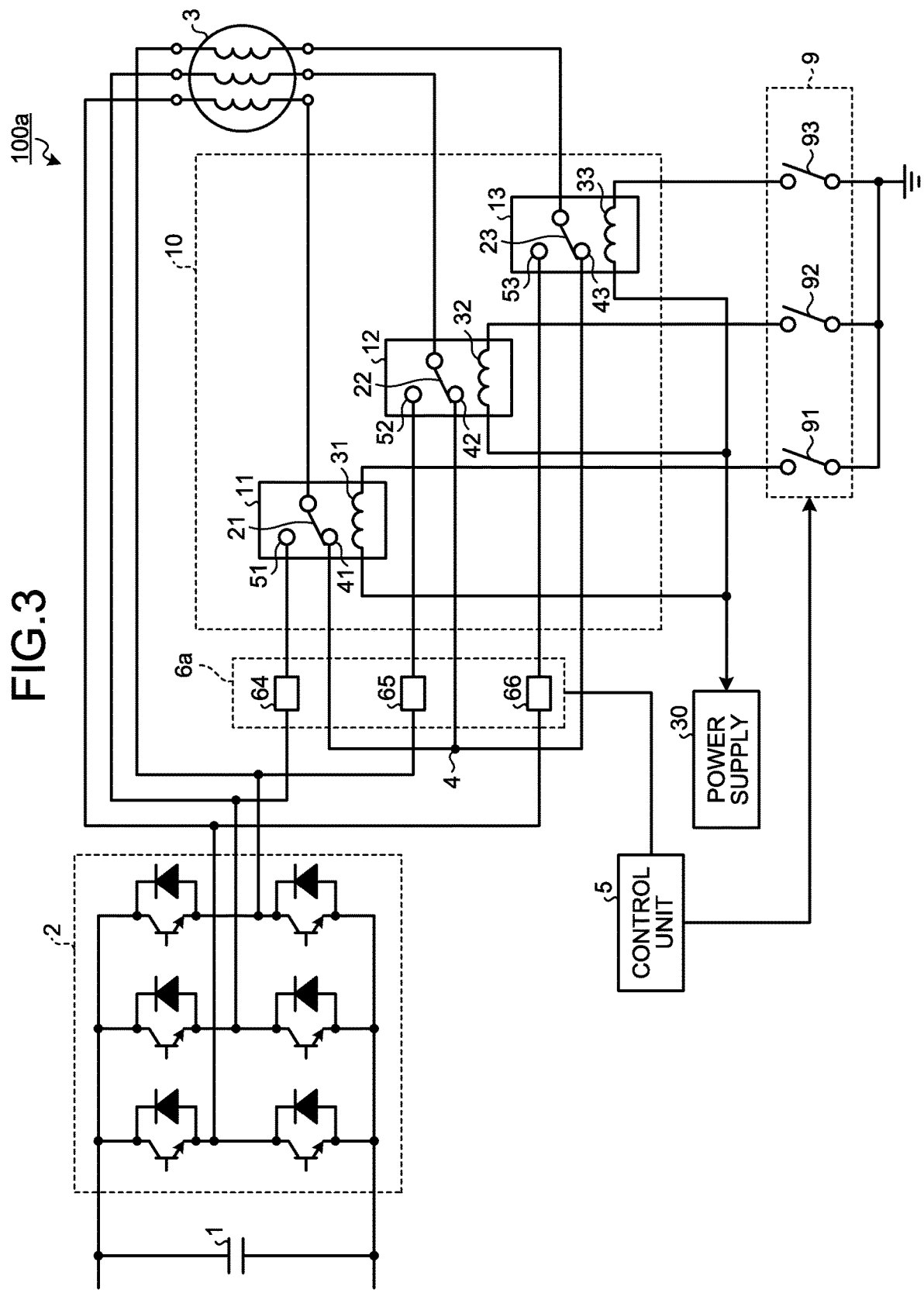
FIG. 3 is a diagram illustrating another example configuration of the motor drive device according to the first embodiment.

Although the motor drive device 100 includes the current detectors 61 to 63 between the neutral point terminal 4 and the relays 11 to 13, the current detectors may be disposed between the output terminals of the inverter 2 and the relays 11 to 13. An example configuration of the motor drive device in such case is illustrated in FIG. 3. FIG. 3 is a diagram illustrating another example configuration of the motor drive device according to the first embodiment. A motor drive device 100*a* illustrated in FIG. 3 includes a state detection unit 6*a* in place of the state detection unit 6 of the motor drive device 100.

The state detection unit 6*a* includes current detectors 64 to 66 having functionality similar to the functionality of the current detectors 61 to 63 described above. The current detector 64 is disposed between the corresponding output terminal of the inverter 2 and the contact 51 of the relay 11. In addition, the current detector 65 is disposed between the corresponding output terminal of the inverter 2 and the contact 52 of the relay 12; and the current detector 66 is disposed between the corresponding output terminal of the inverter 2 and the contact 53 of the relay 13. The current detector 64 detects a current when the contact plate 21 of the relay 11 connects with the contact 51. The current detector 65 detects a current when the contact plate 22 of the relay 12 connects with the contact 52. The current detector 66 detects a current when the contact plate 23 of the relay 13 connects with the contact 53.

The motor drive device 100*a* can also switch the connection configuration of the stator windings of the motor 3 between a star connection and a delta connection using a procedure similar to the procedure used by the motor drive device 100, and can also continue the operation of the motor 3 even when the connection configuration switching unit 10 including the relays 11 to 13 fails.

Moreover, the current detectors 61 to 63 illustrated in FIG. 1 may also be included in the configuration in addition to the current detectors 64 to 66. This configuration enables correct detection of the connection state of both the star connection and the delta connection, and thus enables the control unit 5 to more correctly perform switching of the connection configuration of the stator windings to provide continuous operation of the motor 3.

Figure 4:
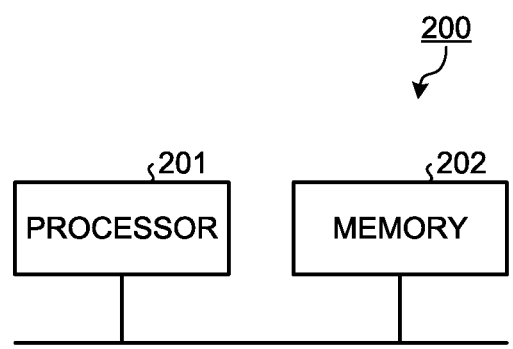
FIG. 4 is a diagram illustrating an example of hardware element to implement the control unit of the motor drive device according to the first embodiment.

A hardware element to implement the control unit 5 of the motor drive devices 100 and 100*a* will next be described. The control unit 5 of the motor drive devices 100 and 100*a* can be implemented using a processing circuit 200 illustrated in FIG. 4.

The processing circuit 200 includes a general-purpose processor 201 and a memory 202, and the memory 202 stores a program for enabling the processor 201 to operate as the control unit 5. That is, the processor 201 reads from the memory 202 a program for enabling the processor 201 to operate as the control unit 5, and executes the program, and can thus implement the control unit 5. The memory 202 also holds information such as a threshold required for the processor 201 that operates as the control unit 5 to control the switches 91 to 93 of the switch unit 9. The processor 201 is a central processing unit (CPU) (also referred to as central processing unit, processing unit, computing unit, microprocessor, microcomputer, processor, and digital signal processor (DSP)), a system large scale integration (LSI), or the like. The memory 202 is a non-volatile or volatile semiconductor memory such as a random access memory (RAM), a read-only memory (ROM), a flash memory, an erasable programmable read-only memory (EPROM), an electrically erasable programmable read-only memory (EEPROM (registered trademark)); a magnetic disk, a flexible disk, an optical disk, a compact disc, a MiniDisc, a digital versatile disc (DVD), or the like.

Note that the control unit 5 may also be implemented in a dedicated hardware element such as a single circuit, a composite circuit, a programmed processor, a parallel programmed processor, an application specific integrated circuit (ASIC), a field programmable gate array (FPGA), or a circuit of combination thereof.

As described above, the motor drive device according to the present embodiment is configured to include three relays for switching the connection configuration of the stator windings of the motor, three current detectors for detecting the internal states of the respective relays, and a control unit that, when detection results of the current detectors do not match, causes stopping of supplying power to the coils that respectively actuate the contact plates of the relays to match the internal states of the respective relays with one another. This enables the relays to have the same internal state to continue the operation of the motor even when electrical power cannot be supplied to the coil(s) of one or some of the relays, thereby enabling improved reliability of operation to be provided.

Second Embodiment

Figure 5:
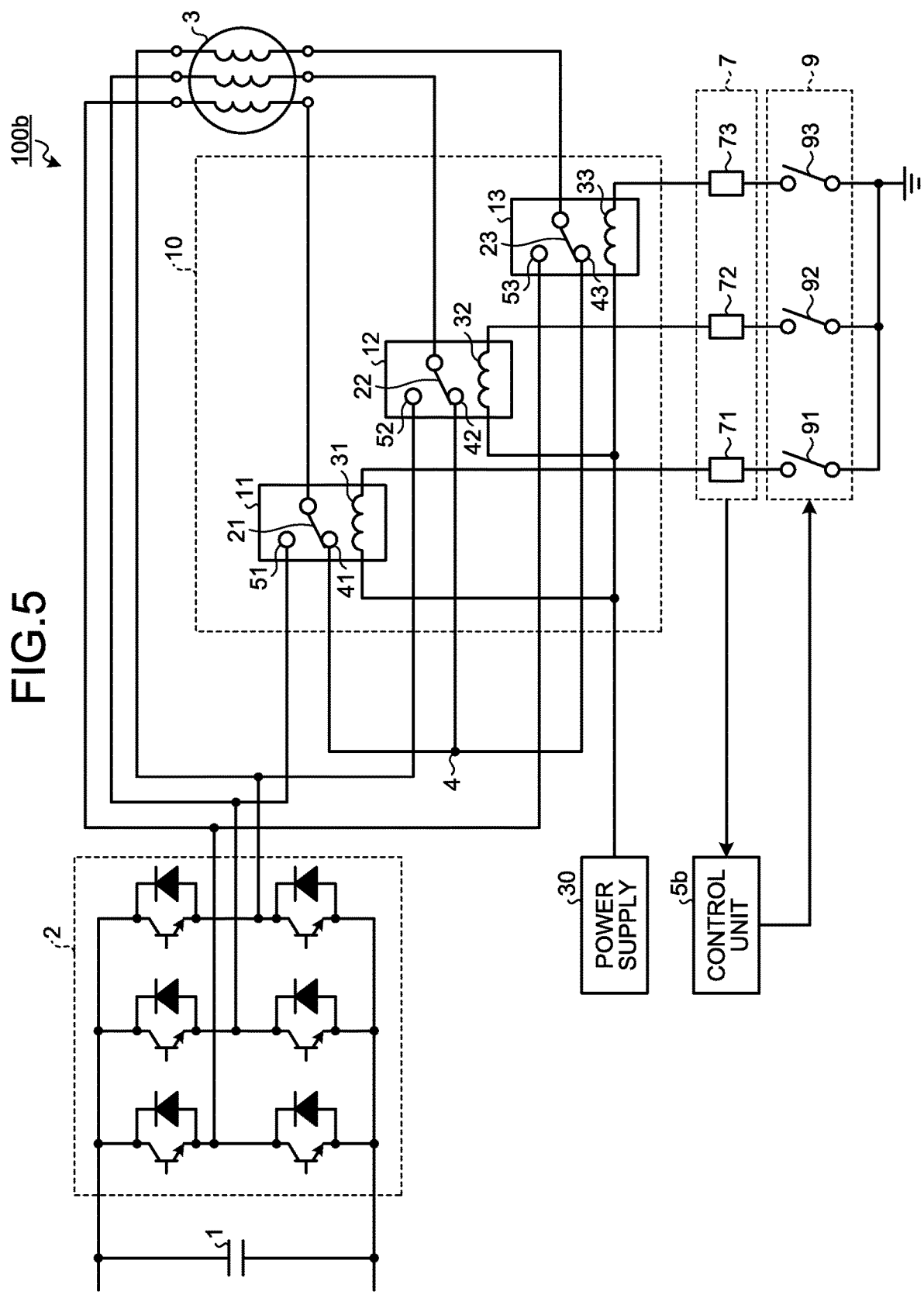
FIG. 5 is a diagram illustrating an example configuration of a motor drive device according to a second embodiment.

FIG. 5 is a diagram illustrating an example configuration of a motor drive device according to a second embodiment. A motor drive device 100*b* according to the second embodiment is configured to include a state detection unit 7 in place of the state detection unit 6 of the motor drive device 100 illustrated in FIG. 1, and also a control unit 5b instead of the control unit 5. The components other than the state detection unit 7 and the control unit 5b are similar to the components of the motor drive device 100 designated by like reference characters. The present embodiment will be described in terms of portions different from the motor drive device 100 according to the first embodiment.

The state detection unit 7 includes current detectors 71 to 73, and detects the states of the contacts of the relays 11 to 13 respectively using these current detectors 71 to 73. The current detector 71 has one terminal coupled to the coil 31 of the relay 11 and the other terminal coupled to the switch 91. The current detector 71 detects a current flowing through the coil 31. The current detector 72 has one terminal coupled to the coil 32 of the relay 12 and the other terminal coupled to the switch 92. The current detector 72 detects a current flowing through the coil 32. The current detector 73 has one terminal coupled to the coil 33 of the relay 13 and the other terminal coupled to the switch 93. The current detector 73 detects a current flowing through the coil 33.

When the current detector 71 detects a current, that is, when a current is flowing through the coil 31, the contact plate 21 of the relay 11 connects with the contact 51. Similarly, when the current detector 72 detects a current, the contact plate 22 of the relay 12 connects with the contact 52. When the current detector 73 detects a current, that is, when a current is flowing through the coil 33, the contact plate 23 of the relay 13 connects with the contact 53.

The control unit 5b controls the switches 91 to 93 on the basis of respective detection results of the current detectors 71 to 73. The control unit 5b operates similarly to the control unit 5 described in the first embodiment except for providing control using detection results of the current detectors 71 to 73. The detection results of the current detectors 61 to 63 illustrated in FIG. 1 and the detection results of the current detectors 71 to 73 both change with changes in the internal states of the relays 11 to 13. This enables the control unit 5b to operate similarly to the control unit 5. Detailed description of the operation of the control unit 5b will be omitted.

As described above, a configuration including current detectors that detect currents respectively flowing through the coils of the relays also enables the internal states of the relays to be detected, and thus allows the motor drive device 100b to provide control similar to the control of the motor drive devices 100 and 100a according to the first embodiment. Thus, a motor drive device can be provided that is capable of providing an advantage similar to the advantage of the first embodiment.

Figure 6:
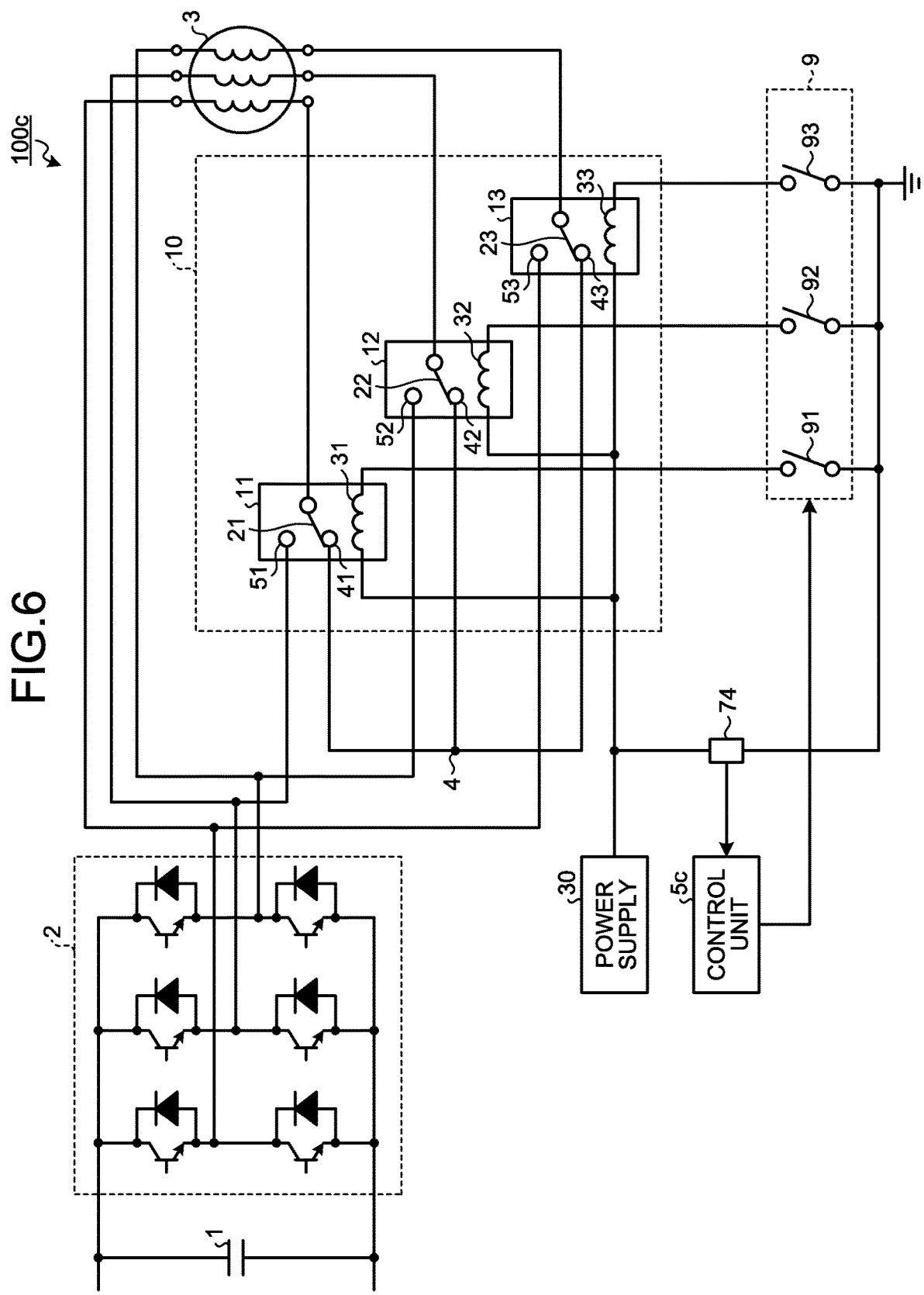
FIG. 6 is a diagram illustrating another example configuration of the motor drive device according to the second embodiment.

Note that a motor drive device 100c configured as illustrated in FIG. 6, that is, configured to include a current detector 74 in place of the current detectors 71 to 73 of the motor drive device 100b and a control unit 5c in place of the control unit 5b can also provide a similar operation, and thus also provides a similar advantage. FIG. 6 is a diagram illustrating another example configuration of the motor drive device according to the second embodiment.

In the motor drive device 100c illustrated in FIG. 6, the current detector 74 detects a current flowing from the power supply 30 into the coils 31, 32, and 33 of the relays 11, 12, and 13.

The control unit 5c controls the switches 91 to 93 on the basis of a detection result of the current detector 74. Specifically, in a case in which the current value at the current detector 74 is greater than zero and less than a threshold, the control unit 5c determines that the internal states of the relays 11 to 13 do not match, that is, the relays 11 to 13 are in states corresponding to the "No" case in the determination at step S14 of the flowchart illustrated in FIG. 2. The threshold for use in this determination is set based on the current value when currents flow through all of the coils 31 to 33, to be less than this current value. For example, assuming that the current value detected by the current detector 74 when currents flow through all of the coils 31 to 33 is 3I, the threshold is set to satisfy a relationship of "2I<threshold<3I".

Third Embodiment

Figure 7:
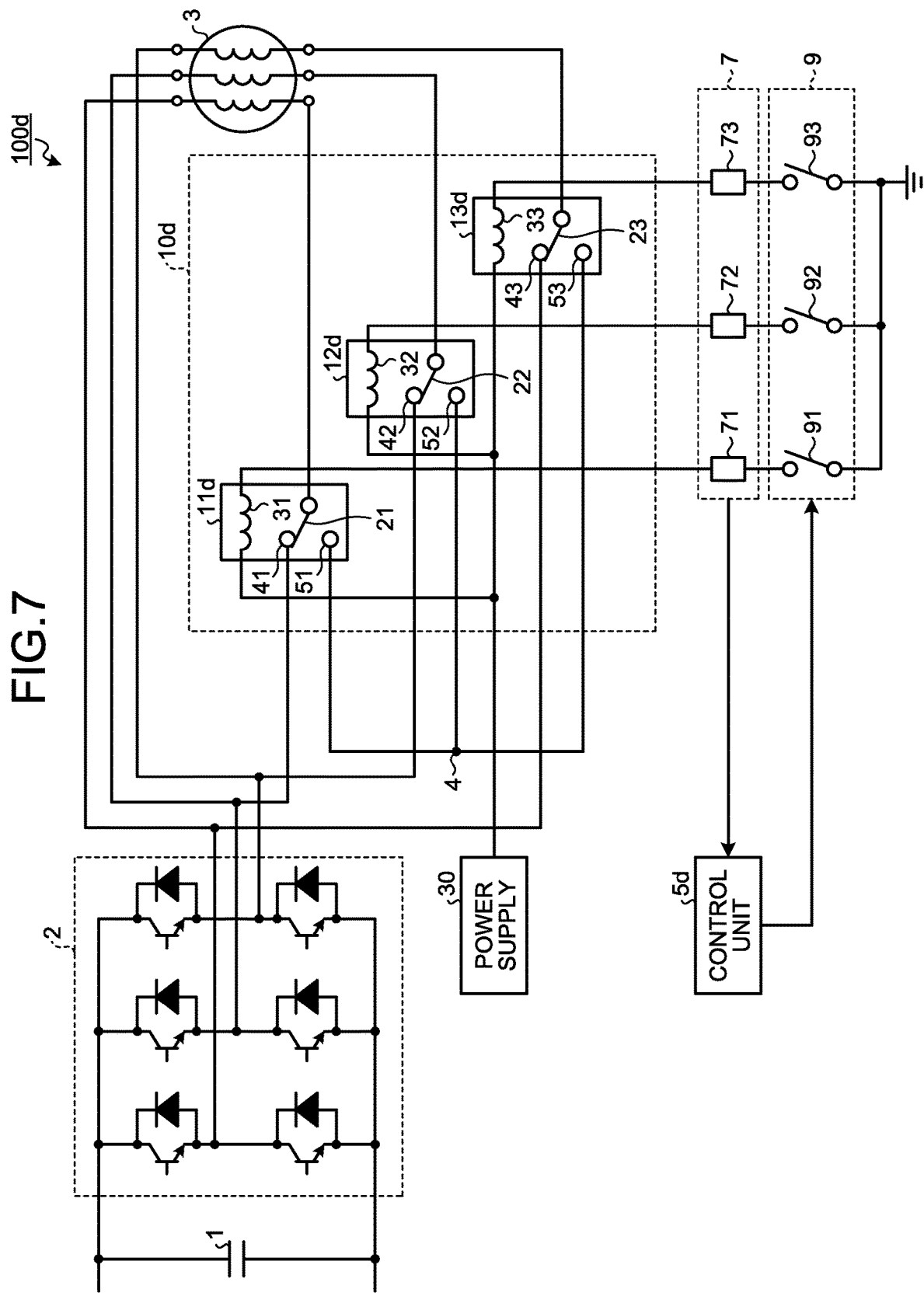
FIG. 7 is a diagram illustrating an example configuration of a motor drive device according to a third embodiment.

FIG. 7 is a diagram illustrating an example configuration of a motor drive device according to a third embodiment. A motor drive device 100d according to the third embodiment is configured to include a connection configuration switching unit 10d in place of the connection configuration switching unit 10 of the motor drive device 100b illustrated in FIG. 5 and a control unit 5d in place of the control unit 5b. The components other than the connection configuration switching unit 10d and the control unit 5d are similar to the components of the motor drive device 100b designated by like reference characters. The present embodiment will be described in terms of portions different from the motor drive device 100b according to the second embodiment.

The connection configuration switching unit 10d includes relays 11d, 12d, and 13d. These relays 11d, 12d, and 13d are configured similarly to the relays 11, 12, and 13 described in the first embodiment, but the contacts thereof are coupled differently. Specifically, the contact 41 of the relay 11d is coupled to the corresponding output terminal of the inverter 2, and the contact 51 is coupled to the neutral point terminal 4. In addition, the contact 42 of the relay 12d is coupled to the corresponding output terminal of the inverter 2, and the contact 52 is coupled to the neutral point terminal 4; and the contact 43 of the relay 13d is coupled to the corresponding output terminal of the inverter 2, and the contact 53 is coupled to the neutral point terminal 4.

The motor drive device 100d arranges the connection configuration of the stator windings of the motor 3 in the delta connection in an initial state in which no currents are flowing through the coils 31, 32, and 33 of the relays 11d, 12d, and 13d, and arranges the connection configuration of the stator windings of the motor 3 in the star connection when currents are flowing through the coils 31, 32, and 33.

The control unit 5d controls the switches 91 to 93 on the basis of respective detection results of the current detectors 71 to 73.

Figure 8:
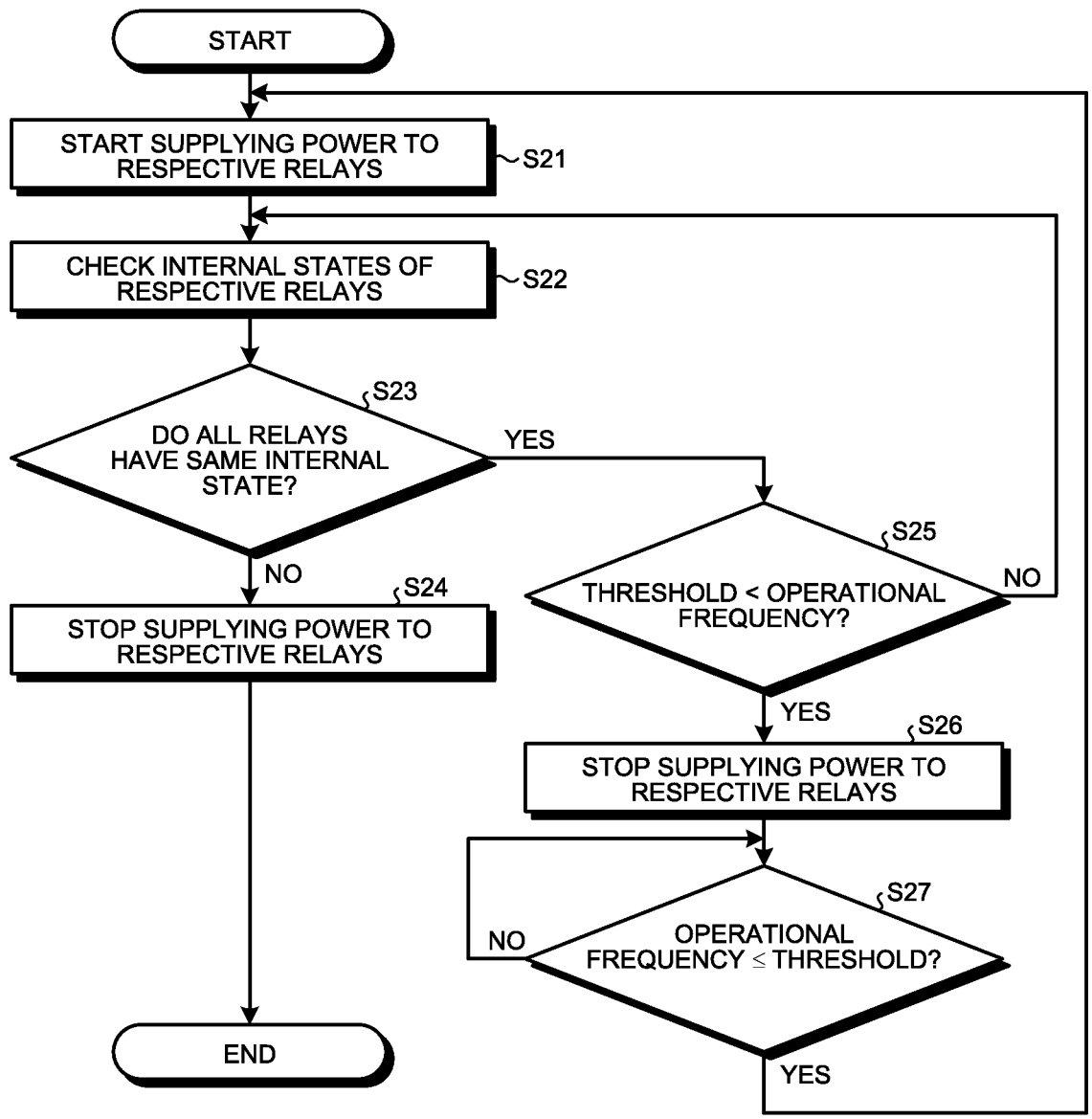
FIG. 8 is a flowchart illustrating an example of operation of switching the connection configuration of the stator windings of the motor performed by the motor drive device according to the third embodiment.

An operation of the motor drive device 100d of switching the connection configuration of the stator windings of the motor 3 will next be described. FIG. 8 is a flowchart illustrating an example of operation of switching the connection configuration of the stator windings of the motor 3 performed by the motor drive device 100d according to the third embodiment. The process at each step illustrated in FIG. 8 is performed by the control unit 5d.

The operation according to the flowchart illustrated in FIG. 8 begins when the inverter 2 starts generation of AC voltage to be applied to the motor 3. It is assumed here that, at the time of the start of the operation, the switches 91 to 93 are in the open state and that the contact plates 21, 22, and 23 of the relays 11d, 12d, and 13d connect respectively with the contacts 41, 42, and 43. That is, it is assumed that the stator windings of the motor 3 are connected in delta connection.

Upon starting of application of AC voltage to the motor 3, the motor drive device 100d starts supplying power to the relays 11d to 13d (step S21). Specifically, the control unit 5d controls the switches 91 to 93 to set the switches 91 to 93 to the closed state to start supplying power respectively to the coils 31 to 33 of the relays 11*d* to 13*d*. This induces magnetic force in the coils 31 to 33 to move the contact plates 21 to 23 of the relays 11*d* to 13*d*. This connects the contact plate 21 to the contact 51, connects the contact plate 22 to the contact 52, and connects the contact plate 23 to the contact 53. That is, the connection configuration of the stator windings of the motor 3 is switched to the star connection.

Next, the motor drive device 100*d* checks the internal states of the respective relays 11*d* to 13*d* (step S22). At this step S22, the control unit 5*d* determines which of the two contacts the contact plates 21 to 23 of the relays 11*d* to 13*d* each connect with, on the basis of the current detection results of the current detectors 71 to 73 of the state detection unit 7. Specifically, the control unit 5*d* determines that the contact plate 21 of the relay 11*d* connects with the contact 51 if the current detector 71 detects a current, determines that the contact plate 22 of the relay 12*d* connects with the contact 52 if the current detector 72 detects a current, and determines that the contact plate 23 of the relay 13*d* connects with the contact 53 if the current detector 73 detects a current.

Then, the motor drive device 100*d* checks whether all the relays 11*d* to 13*d* have the same internal state (step S23).

If all the relays 11*d* to 13*d* have the same internal state (step S23: Yes), the motor drive device 100*d* checks whether the operational frequency of the motor 3 is greater than a predetermined threshold (step S25). This step S25 is a process of determining by the control unit 5*d* of whether the connection configuration needs to be switched to the delta connection. The threshold used is the same as the threshold used at step S11 illustrated in FIG. 2.

If the operational frequency is less than or equal to the threshold (step S25: No), the motor drive device 100*d* returns to step S22 and continues the process. If the operational frequency is greater than the threshold (step S25: Yes), the motor drive device 100*d* stops supplying power to the relays 11*d* to 13*d* (step S26). Specifically, the control unit 5*d* controls the switches 91 to 93 to set the switches 91 to 93 to the open state to stop supplying power respectively to the coils 31 to 33 of the relays 11*d* to 13*d*. This stops the induction of magnetic force in the coils 31 to 33 to move the contact plates 21 to 23 of the relays 11*d* to 13*d*. This causes the contact plate 21 to connect with the contact 41, the contact plate 22 to connect with the contact 42, and the contact plate 23 to connect with the contact 43. That is, the connection configuration of the stator windings of the motor 3 is switched to the delta connection.

Next, the motor drive device 100*d* checks whether the operational frequency of the motor 3 is less than or equal to a predetermined threshold (step S27). This step S27 is a reverse process of step S25 described above, that is, a process of determining by the control unit 5*d* of whether the connection configuration of the stator windings needs to be switched to the star connection. The threshold used is the same as the threshold used at step S16 illustrated in FIG. 2.

If the operational frequency is greater than the threshold (step S27: No), the motor drive device 100*d* repeats the process at step S27.

If the operational frequency is less than or equal to the threshold (step S27: Yes), the motor drive device 100*d* returns to step S21 and continues the process.

Otherwise, if not all the relays 11*d* to 13*d* have the same internal state, that is, if one or some relays of the relays 11*d* to 13*d* have an internal state different from the internal state of the other relay(s) (step S23: No), the motor drive device 100*d* stops supplying power to the relays 11*d* to 13*d* (step S24). This causes, similarly to when step S26 is performed, the connection configuration of the stator windings of the motor 3 to be switched to the delta connection. After performing step S24, the motor drive device 100*d* terminates the operation of switching of the connection configuration of the stator windings, i.e., the operation according to the flowchart illustrated in FIG. 8, and continues the operation, leaving the stator winding of the motor 3 connected in delta connection. The determination at step S23 results in "No" if the internal state of any one of the relays 11*d* to 13*d* fails to match the internal state of other relays due to a cause such as disconnection of the conductor wire of the coil. In this case, the connection configuration of the stator windings of the motor 3 is neither the star connection nor the delta connection, in which condition continuous operation of the motor 3 is undesirable. Accordingly, the motor drive device 100*d* performs step S24 to stop supplying power to the relays 11*d* to 13*d* to cause all the relays 11*d* to 13*d* to have the same internal state. After performing step S24, the motor drive device 100*d* does not perform switching of the connection configuration of the stator windings of the motor 3 from the delta connection to the star connection even when the operational frequency exceeds the threshold, but can continue the operation of the motor 3. That is, even when the connection configuration switching unit 10*d* including the relays 11*d* to 13*d* for enabling switching of the connection configuration of the stator windings of the motor 3 fails, the motor drive device 100*d* can continue the operation of the motor 3.

The motor drive device according to each of the first and second embodiments described above is configured to continue, without stopping, the operation with the stator windings of the motor 3 being star-connected in a case in which one or some of the relays have an internal state different from the internal state of other relays, that is, when a condition in which current cannot flow to the coil(s) of one or some of the relays is detected. Operation in the star connection enables high efficiency operation in a low operational frequency range, but on the other hand, presents a problem of a significant reduction in the efficiency in a high operational frequency range, and presents another problem of high tendency to cause unstable operation and loss of synchronism under a high torque condition. In contrast, upon determination that one or some of the relays have an internal state different from the internal state of other relays, the motor drive device 100*d* according to the present embodiment continues the operation with the stator windings of the motor 3 being delta-connected. Despite reduced efficiency in a low operational frequency range, this makes it less likely that unstable operation and loss of synchronism will occur under a high torque condition, thereby enabling stable operation even in a high speed range.

Fourth Embodiment

The motor drive devices described in the first to third embodiments use a monostable relay as each of the relays 11, 12, 13, 11*d*, 12*d*, and 13*d*. In contrast, a motor drive device according to the present embodiment uses a bistable relay for each of the relays 11, 12, 13, 11*d*, 12*d*, and 13*d* of the motor drive devices described in the first to third embodiments. The motor drive device according to the present embodiment is similar to the motor drive device described in each of the first to third embodiments except that the relays used are changed from monostable relays to bistable relays. Thus, operation only relating to the bistable relays will be described below.

When the relays 11, 12, and 13 are monostable relays, connection of the contact plates 21, 22, and 23 with the contacts 51, 52, and 53 requires currents to continuously flow through the coils 31, 32, and 33. That is, when currents are flowing through the coils 31, 32, and 33, the contact plates 21, 22, and 23 are connected with the contacts 51, 52, and 53, while when no currents are flowing through the coils 31, 32, and 33, the contact plates 21, 22, and 23 are connected with the contacts 41, 42, and 43. Thus, the motor drive devices 100, 100a, 100b, and 100c described in the first and second embodiments are required to allow currents to continuously flow through the coils 31, 32, and 33 during operation performed when the stator windings of the motor 3 are delta-connected, and thus each have an issue with increase in power consumption in the coils 31, 32, and 33. Similarly, the motor drive device 100d described in the third embodiment is required to allow currents to continuously flow through the coils 31, 32, and 33 during operation performed when the stator windings of the motor 3 are star-connected, and thus has an issue with increase in power consumption in the coils 31, 32, and 33.

In contrast, the motor drive device according to the present embodiment uses, as described above, bistable relays in place of monostable relays. A bistable relay requires current to flow only for a certain predetermined time period to switch the contact with which a contact plate is connected, and does not require continuous current flow to maintain the connection state. For example, when the relay 11 described above is a bistable relay, the contact plate 21 can be switched from being connected to the contact 41 to being connected the contact 51 by closing the switch 91 only for a certain time period to pass a current through the coil 31, and even if the switch 91 is opened to stop current flow through the coil 31 after the certain time period has elapsed, it is still possible to keep the contact plate 21 connecting with the contact 51. Similarly, the contact plate 21 can be switched from being connected with the contact 51 to being connected with the contact 41 by closing the switch 91 only for the certain time period to pass a current through the coil 31.

A description will be given of an operation of the motor drive device 100, specifically, an operation of the motor drive device 100 of switching the connection configuration of the stator windings of the motor 3, when bistable relays are used as the relays 11, 12, and 13 of the motor drive device 100 described in the first embodiment. Operation different from the operation of the first embodiment will be described.

Figure 9:
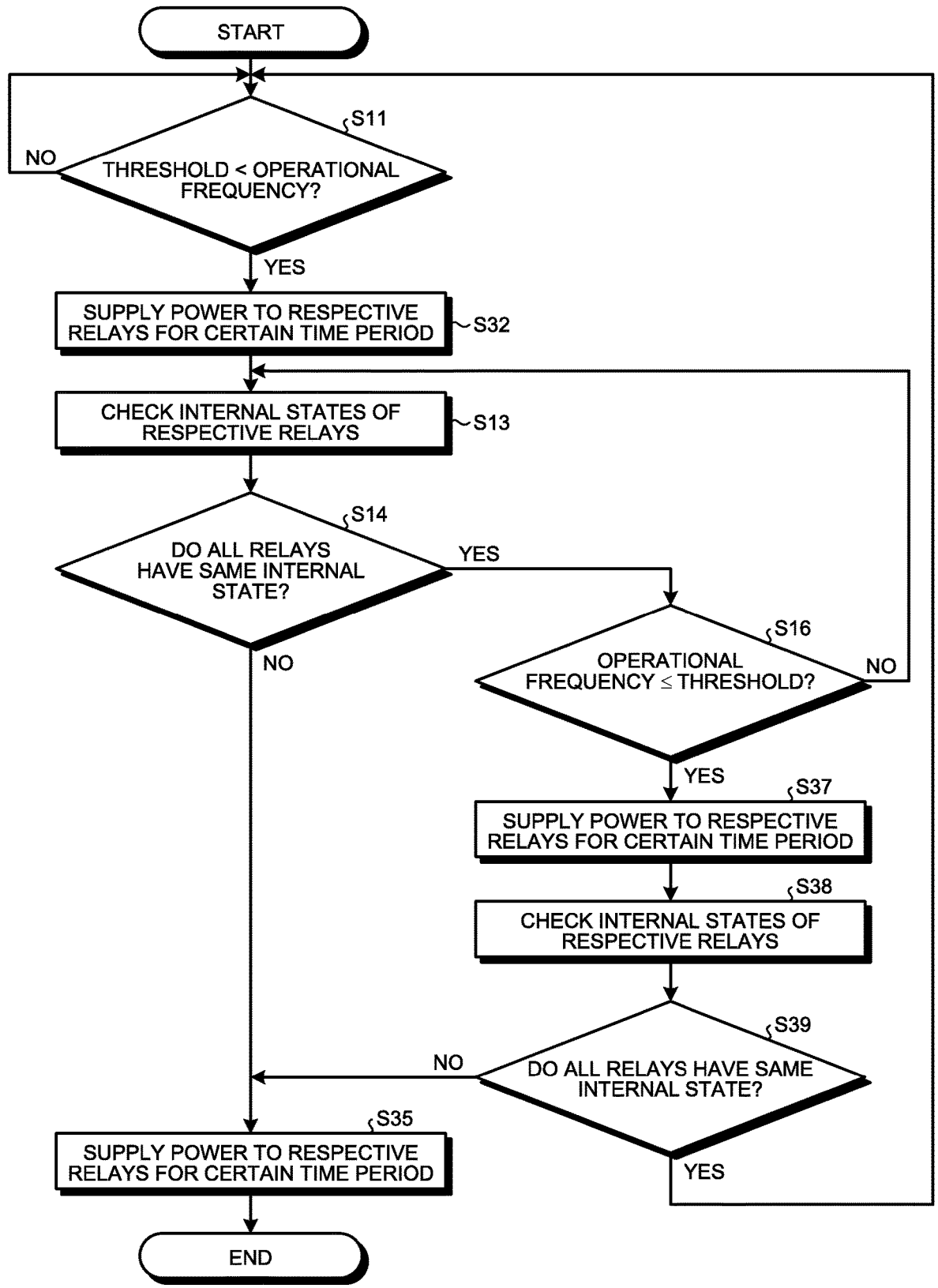
FIG. 9 is a flowchart illustrating an example of operation of switching the connection configuration of the stator windings of the motor performed by a motor drive device according to a fourth embodiment.

FIG. 9 is a flowchart illustrating an example of operation of switching the connection configuration of the stator windings of the motor 3 performed by the motor drive device 100 according to a fourth embodiment. The flowchart illustrated in FIG. 9 includes steps S32, S35, and S37 in place of steps S12, S15, and S17, respectively, in the flowchart illustrated in FIG. 2, and additionally includes steps S38 and S39.

The process at steps S32, S35, S37, S38, and S39 different from the first embodiment will be described below. At steps S32, S35, and S37, the motor drive device 100 supplies electrical power to the relays 11 to 13 for a certain time period.

After performing step S37, the motor drive device 100 checks the internal states of the respective relays (step S38), and then checks whether all the relays 11 to 13 have the same internal state (step S39). These steps S38 and S39 are similar processes to steps S13 and S14. If all the relays 11 to 13 have the same internal state (step S39: Yes), the motor drive device 100 returns to step S11 and continues the process. If not all the relays 11 to 13 have the same internal state, that is, if one or some relays of the relays 11 to 13 have an internal state different from the internal state of the other relay(s) (step S39: No), the motor drive device 100 performs step S35.

Step S35 is performed when one or some relays of the relays 11 to 13 have an internal state different from the internal state of the other relay(s), in which condition the contact with which the contact plate is connected is not switched for the relay whose coil cannot be supplied with a current due to a cause such as disconnection. On the contrary, the contact with which the contact plate is connected is switched for each of the other relay(s) whose coil can be supplied with a current. Therefore, after the performance of step S35, the relays 11 to 13 will have the same internal state, and the stator windings of the motor 3 will be connected in star connection or in delta connection. Thus, even when one or some of the relays 11 to 13 fail and can no longer switch the state(s) of the corresponding contact plate(s), the motor drive device 100 can continue the operation of the motor 3.

An example operation has been described in terms of the motor drive device 100 whose relays 11 to 13 are bistable relays, but a similar operation also applies to the motor drive devices 100a, 100b, and 100c whose relays 11 to 13 are bistable relays.

In addition, when the relays 11d to 13d of the motor drive device 100d are bistable relays, the process can be performed such that, for example, steps S21, S24, and S26 of the flowchart illustrated in FIG. 8 are each replaced by the process of supplying electrical power to the relays 11d to 13d for a certain time period. In this case, after performing the process performed instead of step S26, i.e., "process of supplying electrical power to the relays 11d to 13d for a certain time period", the motor drive device 100d checks whether all the relays 11d to 13d have the same internal state. If all the relays 11d to 13d have the same internal state, the motor drive device 100d performs step S27. If not all the relays 11d to 13d have the same internal state, the motor drive device 100d supplies electrical power to the relays 11d to 13d for a certain time period, and then terminates the operation of switching of the connection configuration of the stator windings of the motor 3. That is, the motor drive device 100d supplies electrical power to the relays 11d to 13d for a certain time period to actuate the contact plates 21 to 23, then checks the internal states of the respective relays, and if not all the internal states are the same, performs a process of setting the relays to the same internal state. Then, the motor drive device 100d terminates the operation of switching of the connection configuration of the stator windings of the motor 3.

The configurations described in the foregoing embodiments are merely examples of various aspects of the present invention. These configurations may be combined with a known other technology, and moreover, a part of such configurations may be omitted and/or modified without departing from the spirit of the present invention.

The invention claimed is:

1. A motor drive device capable of switching a connection configuration of stator windings of a motor, the motor drive device comprising:
three relays each including a first contact, a second contact, a contact plate, and a coil for actuating the contact plate, wherein the contact plate has one terminal coupled to a stator winding of one phase among the stator windings and the contact plate has another terminal to be connected to the first contact or to the second contact;

a current detector configured to detect current flowing through any of the first contact and the second contact of each of the three relays; and a controller configured to determine whether all the three relays have a same connection state with respect to a connection between the another terminal of the contact plate and the first contact and the second contact on a basis of a value of current flowing through any of the first contact and the second contact detected by the current detector, and control the three relays to cause all the three relays to have a same connection state in a case in which the controller determines that not all the three relays have a same connection state with respect to a connection between the another terminal of the contact plate and the first contact and the second contact.

2. The motor drive device according to claim 1, wherein the controller controls the three relays such that the three relays each have the contact plate positioned in an initial state by stopping supplying power to the coil in a case in which the controller determines that not all the three relays have a same connection state.

3. The motor drive device according to claim 2, wherein the connection configuration is set to a star connection in a case in which all the three relays have the contact plates positioned in the initial state, and the connection configuration is set to a delta connection in a case in which the controller determines that not all the three relays have the contact plates positioned in the initial state.

4. The motor drive device according to claim 2, wherein the connection configuration is set to a delta connection in a case in which all the three relays have the contact plates positioned in the initial state, and the connection configuration is set to a star connection in a case in which the controller determines that not all the three relays have the contact plates positioned in the initial state.

5. The motor drive device according to claim 1, wherein the controller performs switching control to control the three relays to switch the connection configuration between a star connection and a delta connection each time an operational frequency of the motor exceeds or falls below a threshold in a case in which all the three relays have a same connection state, and the controller stops performing the switching control after detecting that not all the three relays have a same connection state and controlling the three relays to cause all the three relays to have a same connection state by stopping supplying power to the coil.

6. The motor drive device according to claim 1, wherein the relays are bistable relays.

7. A motor drive device capable of switching a connection configuration of stator windings of a motor, the motor drive device comprising:

three relays each including a first contact, a second contact, a contact plate, and a coil for actuating the contact plate, wherein the contact plate has one terminal coupled to a stator winding of one phase among the stator windings and the contact plate has another terminal to be connected to the first contact or to the second contact; and a current detector configured to detect current flowing through the coil of each of the three relays;

a controller configured to determine whether all the three relays have a same connection state with respect to a connection between the another terminal of the contact plate and the first contact and the second contact on a basis of a value of current flowing through the coil detected by the current detector and control the three relays to cause all the three relays to have a same connection state in a case in which the controller determines that not all the three relays have a same connection state with respect to a connection between the another terminal of the contact plate and the first contact and the second contact.

8. The motor drive device according to claim 7, wherein the controller controls the three relays such that the three relays each have the contact plate positioned in an initial state by stopping supplying power to the coil in a case in which the controller determines that not all the three relays have a same connection state.

9. The motor drive device according to claim 8, wherein the connection configuration is set to a star connection in a case in which all the three relays have the contact plates positioned in the initial state, and the connection configuration is set to a delta connection in a case in which the controller determines that not all the three relays have the contact plates positioned in the initial state.

10. The motor drive device according to claim 8, wherein the connection configuration is set to a delta connection in a case in which all the three relays have the contact plates positioned in the initial state, and the connection configuration is set to a star connection in a case in which the controller determines that not all the three relays have the contact plates positioned in the initial state.

11. The motor drive device according to claim 7, wherein the controller determines whether all the three relays have a same connection state on a basis of a total value of current flowing through the coils of the three relays.

12. The motor drive device according to claim 7, wherein the controller performs switching control to control the three relays to switch the connection configuration between a star connection and a delta connection each time an operational frequency of the motor exceeds or falls below a threshold in a case in which all the three relays have a same connection state, and the controller stops performing the switching control after detecting that not all the three relays have a same connection state and controlling the three relays to cause all the three relays to have a same connection state by stopping supplying power to the coil.

13. The motor drive device according to claim 7, wherein the relays are bistable relays.

* * * * *